(12) United States Patent
Villatel et al.

(10) Patent No.: US 10,534,739 B2
(45) Date of Patent: Jan. 14, 2020

(54) INDICATING A PRIVILEGE LEVEL

(71) Applicant: HEWLETT PACKARD ENTERPRISE DEVELOPMENT LP, Houston, TX (US)

(72) Inventors: Maugan Villatel, Bristol (GB); David Plaquin, Bristol (GB); Chris I. Dalton, Bristol (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 124 days.

(21) Appl. No.: 15/515,743

(22) PCT Filed: Oct. 31, 2014

(86) PCT No.: PCT/US2014/063281
§ 371 (c)(1),
(2) Date: Mar. 30, 2017

(87) PCT Pub. No.: WO2016/068962
PCT Pub. Date: May 6, 2016

(65) Prior Publication Data
US 2017/0293581 A1    Oct. 12, 2017

(51) Int. Cl.
G06F 13/40      (2006.01)
G06F 12/14      (2006.01)
G06F 13/36      (2006.01)
G06F 21/62      (2013.01)
G06F 21/78      (2013.01)

(52) U.S. Cl.
CPC .......... *G06F 13/40* (2013.01); *G06F 12/1491* (2013.01); *G06F 12/14* (2013.01); *G06F 13/36* (2013.01)

(58) Field of Classification Search
CPC . G06F 12/14; G06F 13/36; G06F 3/00; G06F 11/30; G06F 13/42
See application file for complete search history.

(56) References Cited

U.S. PATENT DOCUMENTS

| | | | |
|---|---|---|---|
| 4,384,322 A * | 5/1983 | Bruce | G06F 13/36 710/306 |
| 8,091,086 B1 | 1/2012 | Ershov et al. | |
| 8,806,110 B2 | 8/2014 | Zbiciak et al. | |
| 2002/0141424 A1 * | 10/2002 | Gasbarro | H04F 49/35 370/412 |

(Continued)

FOREIGN PATENT DOCUMENTS

TW    200417869 A    9/2004

OTHER PUBLICATIONS

Adam Belay et al., "Dune: Safe User-level Access to Privileged CPU Features," 2012, pp. 1-14, Stanford University, Available at: <dune.scs.stanford.edu/belay:dune.pdf>.

(Continued)

*Primary Examiner* — Getente A Yimer
(74) *Attorney, Agent, or Firm* — Hewlett Packard Enterprise Patent Department (57) ABSTRACT

A bus between a requester and a target component includes a portion dedicated to carry information indicating a privilege level, from among a plurality of privilege levels, of machine-readable instructions executed on the requester.

15 Claims, 5 Drawing Sheets

(56) References Cited

U.S. PATENT DOCUMENTS

| | | | |
|---|---|---|---|
| 2005/0005049 A1* | 1/2005 | Montalvo | G06F 13/4291 |
| | | | 710/110 |
| 2005/0182963 A1 | 8/2005 | Phillips et al. | |
| 2006/0047958 A1 | 3/2006 | Morais et al. | |
| 2008/0082707 A1* | 4/2008 | Gupta | G06F 13/1615 |
| | | | 710/110 |
| 2009/0013406 A1 | 1/2009 | Cabuk et al. | |
| 2011/0258683 A1 | 10/2011 | Cicchitto | |
| 2012/0191899 A1* | 7/2012 | Zbiciak | G06F 13/366 |
| | | | 711/103 |
| 2013/0159663 A1 | 6/2013 | Levenglick et al. | |
| 2014/0006739 A1 | 1/2014 | Dixon et al. | |
| 2014/0229690 A1 | 8/2014 | Muff et al. | |
| 2015/0229325 A1* | 8/2015 | Hollis | G06F 13/4221 |
| | | | 710/106 |

OTHER PUBLICATIONS

International Search Report and Written Opinion, International Application No. PCT/US2014/063281, dated May 28, 2015, pp. 1-7, KIPO.

\* cited by examiner

INDICATING A PRIVILEGE LEVEL

BACKGROUND

A system, such as a computer or other type of electronic device, can include a processor and a memory device, in addition to other components. Machine-readable instructions executing on the processor can issue requests to access data in the memory device. A request issued to a memory device can include a read request to read data or a write request to modify data or insert new data.

BRIEF DESCRIPTION OF THE DRAWINGS

Some implementations are described with respect to the following figures.

DETAILED DESCRIPTION

A requester in an electronic device can issue a request to a target device. The request can include a request to access a resource associated with the target device. In some examples, an electronic device can include a computer (e.g. desktop computer, notebook computer, tablet computer, server computer, etc.), a handheld device (e.g. a smartphone, a personal digital assistant), a game appliance, a storage controller, a communication node, any other electronic device, or any combination of the foregoing.

In some examples, a requester can include a processor, while a target device can include a memory device. In other examples, a requester can include an input/output (I/O) device, a controller, an application-specific integrated circuit (ASIC) device, a programmable gate array (PGA) device, or any other type of device that is able to issue a request. In further examples, a target device can include an I/O device, a persistent storage device, a processor, a controller, an ASIC device, a PGA device, or any other device or target component that is able to respond to a request from a requester.

Machine-readable instructions can execute on a requester. As examples, the machine-readable instructions stored on a non-transitory storage medium can include application software modules, firmware modules, scripts, operating system modules, virtualization modules, and so forth. In the ensuing discussion, reference is made to a "program module" (which can refer to any of the foregoing machine-readable instructions stored on the non-transitory storage medium) that is executable on a requester to issue a request to access a resource associated with a target device.

A resource associated with a target device can reside within the target device, or can be external of the target device but coupled to the target device. A resource can be "coupled" to a target device by physically coupling (directly or indirectly) or communicatively coupling. Examples of a resource can include a memory region (a portion of a memory device or memory devices), a storage region (a portion of a persistent storage device or persistent storage devices), configuration register(s) (that can store configuration information for configuring the target device), or any other type of resource that can be accessed by a requester to perform an operation.

Access of certain resources can be restricted based on privilege levels of program modules. For example, a given resource (e.g. a memory region or other resource) may be accessible by a program module at a specific privilege level, but inaccessible to a program module at another privilege level. As another example, the given resource may be partially accessible by a program module at a respective privilege level (e.g. the program module may have read-only access of the given resource but not write access). Program modules executing on a requester can run at one of various different privilege levels. Different privilege levels can correspond to different rights of program modules to access resources of a system. A program module at a lower privilege level may be able to access fewer resources than a program module at a higher privilege level. Use of privilege levels allows a system to protect against unauthorized access of certain resources in the system.

In some traditional examples, a control component used to restrict access to resources can be relatively complex. Use of such a complex control component can lead to increased complexity of a system that includes the control component, which can lead to increased cost and lower reliability of the system. Moreover, in some cases, the control component may still not adequately protect against unauthorized access of resources.

In accordance with some implementations, a bus that interconnects a requester and a target device is extended to include a portion (referred to hereinafter as a "privilege information portion" of the bus) that carries information indicating a privilege level of a program module executing on the requester that initiated a request to the target device. The indicated privilege level is a selected one of multiple privilege levels. By indicating a privilege level of a program module using the privilege information portion of the bus, a target device is able to decide whether or not access of a requested resource is allowed or denied, or whether partial access is granted.

Figure 1:
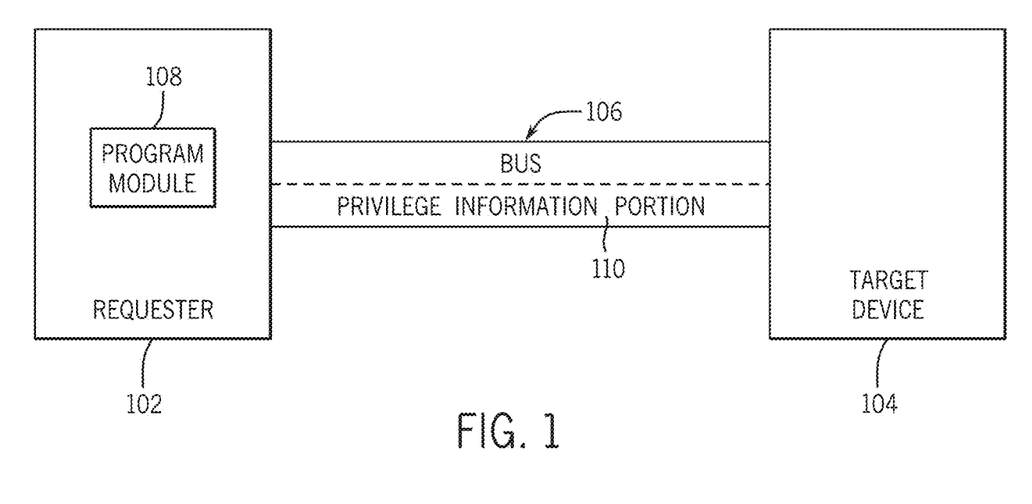
FIG. 1 is a block diagram of an example arrangement that includes a requester and a target device that are interconnected by a bus, in accordance with some implementations.

FIG. 1 is a block diagram of an example arrangement that includes a requester 102 that is able to issue a request to a target device 104. The requester 102 and the target device 104 are interconnected by a bus 106. A "bus" as used in the present disclosure can refer to a communications medium (or a set of communications media) that allow for the communication of information between devices. The communications medium (or media) can be implemented as electrical wires, and/or optical links, and/or other types of communication links, or some combination of the foregoing.

More generally, a bus can include a number of lanes, where a lane can refer to an electrical wire, and/or an optical link, and/or another type of communication link, or some combination of the foregoing. A "portion" of the bus can refer to a subset of the lanes of the bus, where the subset can include one or multiple lanes (less than all of the lanes of the bus).

As further shown in FIG. 1, a program module 108 is executable on the requester 102 to issue a request to the target device 104 over the bus 106. In some examples, the target device 104 can include a memory device. In these examples, the bus 106 can be a memory bus. In other examples, the target device 104 can be an I/O device or another type of device. In such other examples, the bus 106 can include an I/O bus, or another type of bus.

In accordance with some implementations, the bus 106 includes a privilege information portion 110 dedicated for carrying privilege information that indicates a privilege level of the program module 108. The privilege information portion 110 includes a subset of the lanes of the bus 106, where the subset of the lanes is dedicated to carry the privilege information. A subset of lanes is "dedicated" to carry privilege information by having the subset of lanes reserved for carrying the privilege information and not for carrying other information. The subset of lanes dedicated to carry the privilege information can include new lane(s) added to a bus, or can include existing lane(s) of a bus.

The requester 102 is aware of the privilege level at which the program module 108 is executed. As an example (discussed further below with FIG. 2), as the program module 108 executes on the requester 102, a privilege level register associated with the instructions of the program module 108 can store an indicator of the privilege level. Responsive to the requester 102 issuing a request over the bus 106 in response to receiving a corresponding request from the program module 108, the requester 102 can set the privilege information portion 110 to a selected one of multiple values that correspond to different privilege levels. As an example, a mapping structure can include entries, where each of the entries contains information mapping a respective privilege level of machine-readable instructions to a corresponding value that is to be carried by the privilege information portion 110. The mapping structure can be stored in a non-transitory storage medium, and the content of the mapping structure can be statically set or dynamically set, by a user, a machine, or code.

Although FIG. 1 shows just one program module 108 executing on the requester 102, it is noted that there can be multiple program modules executable on the requester. The multiple program modules can execute at respective different privilege levels. As a result, depending on which program module issued a request to the target device 104, the requester 102 can set the privilege information portion 110 to the corresponding value to specify the respective privilege level of the requesting program module.

The privilege levels used in a system can depend on which system architecture is implemented. Different system architectures can employ different respective predefined sets of privilege levels. For example, in an ARM architecture provided by ARM Holdings plc, the following predefined privilege levels may be provided: EL0, EL1, EL2, and EL3. EL3 is the highest privilege level, while EL0 is the lowest privilege level.

In other architectures, such as the architecture for Intel processors, the predefined privilege levels can include different ring levels, such as ring 0, ring 1, and ring 2. Ring 3 corresponds to the user mode privilege level, which is the lowest privilege level. Ring 0 corresponds to the highest privilege level, also referred to as a kernel mode level. Ring 2 can correspond to a root mode privilege level.

In systems that employ the ARM architecture, user applications can be assigned to the EL0 level. Operating systems can be assigned to the EL1 privilege level. The EL3 level is associated with ARM's Trust Zone security monitor that controls security in a system. In systems that implement virtualization, a virtual machine monitor (VMM) or hypervisor can be assigned to the EL2 level. In a system that implements virtualization, a hypervisor or VMM manages the physical resources (e.g. a processor, a memory device, an I/O device, etc.) of the system. In some examples, virtual machines (VMs) can be deployed in the system. A VM emulates a physical machine, and shares the physical resources of the system with other VMs. Each VM can include a guest operating system (which can be assigned to the EL1 privilege level) and one or multiple application programs (which can be assigned to the EL0 level) executing in the VM. The hypervisor or VMM can allocate the physical resources to the VMs. In other examples, other assignments of privilege levels to respective entities can be provided.

In systems that implement the Intel processor architecture, user applications can be assigned to the ring 3 level (the lowest privilege level). Operating system modules can be assigned to the ring 0 level (the highest privilege level). Other entities can be assigned to the ring 2 level. In implementations where a VMM or hypervisor is present, a privilege level higher than the ring 0 level can be provided and assigned to the VMM or hypervisor. In other examples, other assignments of privilege levels to respective entities can be provided.

In response to an instruction of the program module 108, the requester 102 issues a corresponding request on the bus 106. Note that the request issued on the bus 106 is "initiated" by the program module 108—in other words, the request on the bus 106 is issued on the bus 106 in response to functionality performed by the program module 108.

The request issued on the bus 106 can include a command that has control information, an address, and the privilege information. The control information can specify the type of operation to be performed (e.g. a read operation to read data, a write operation to write data, etc.). The control information can be carried in a control portion of the bus 106. The control portion of the bus 106 can be made up of one or more of the subset of the lanes of the bus 106 dedicated to carry privilege information.

The address can identify a location of a resource (such as a memory region in a memory device) associated with the requested operation. The address can be included in an address portion of the bus 106. The address portion of the bus 106 is made up of another subset of lanes of the bus 106. Note that the address portion and the control portion can also be dedicated portions of the bus, in some examples.

More generally, the bus 106 can be implemented as plural lanes, where the plural lanes can include the control portion, the address portion, and the privilege information portion 110.

The target device 104 receives the request over the bus 106. The target device 104 is able to decode the control information (provided in the control portion of the bus 106) of the request to determine the requested type of operation, and can identify the location to be accessed using the address (provided in the address portion of the bus 106). In addition, the target device 104 can determine the privilege level of the program module 108 that initiated the request using the value included in the privilege information portion 110 of the bus 106.

The target device 104 can then apply a corresponding action, selected from among possible multiple actions, based on the privilege level indicated by the privilege information portion 110. For example, responsive to a determination by the target device 104 the value of the privilege information portion 110 indicates a first privilege level, then the target device 104 can grant access to a specified memory region. However, responsive to the value of the privilege information portion 110 indicating a second privilege level, the target device 104 can block or prevent access of the specified memory region. Alternatively, responsive to the value of the privilege information portion 110 indicating the second privilege level or another privilege level, the target device 104 can grant partial access, such as read-only access, of the specified memory region.

The action to take in response to an indicated privilege level can be based on policy information stored in a non-transitory storage medium of the target device 104. The policy information can specify rules governing actions to be performed in response to requests to access specified resources from program modules at respective privilege levels. For example, the policy information can include respective policies for corresponding different resources. Each policy can specify the privilege level(s) of a program module that is allowed access to the respective resource. The policy information can be dynamically set or statically set, either by a user, a machine, or code.

In the foregoing discussion, memory regions of the target device 104 are described as examples of resources that are accessible by the program module 108 executed on the requester 102. In other examples, resources can include configuration registers in a configuration space of the target device 102. The configuration registers can be programmed to configure the target device 104. The target device 104 can allow the configuration registers to be updated and/or read by a program module that is at greater than a specified privilege level (or privilege levels), based on policy information as discussed above, for example. For example, the target device 104 can allow the configuration registers to be updated and/or read by a program module at a privilege level assigned to an operating system or a VMM or hypervisor, but will prevent the configuration registers from being updated and/or read by a program module at a privilege level assigned to user applications.

More generally, the target device 104 can include or can be associated with a resource whose access is to be restricted based on the privilege level of a program module that is attempting access of the resource, where the privilege level is indicated by the value set in the privilege information portion 110 of the bus 106.

Figure 2:
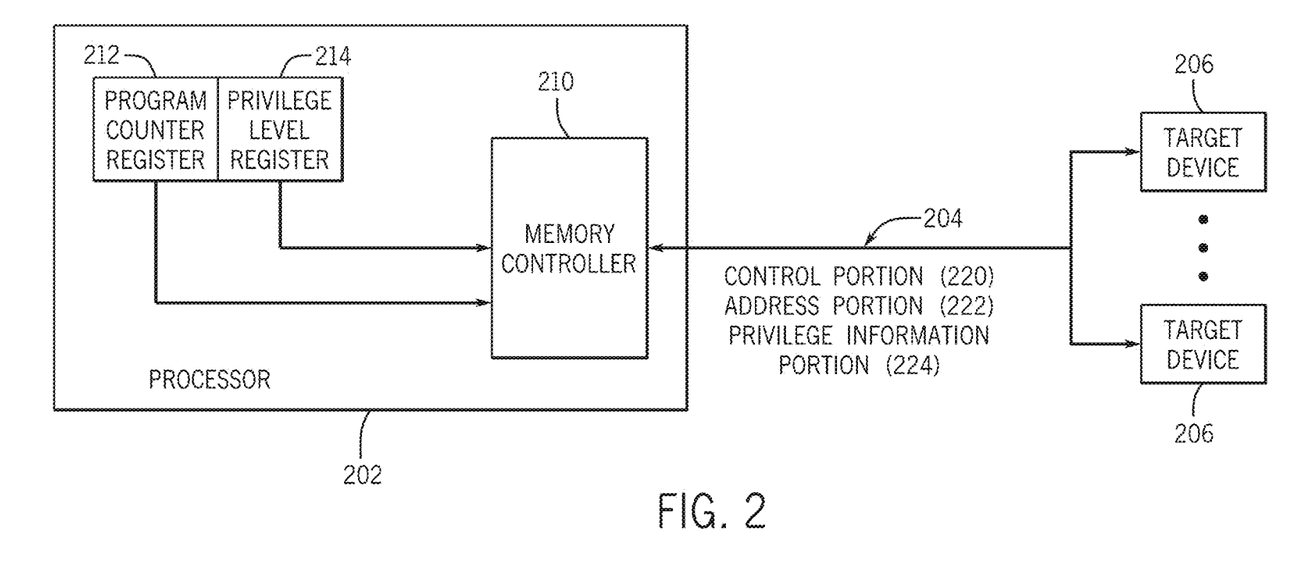
FIG. 2 is a block diagram of another example arrangement that includes a processor and target devices interconnected by a memory bus, in accordance with further implementations.

FIG. 2 is a block diagram of an example arrangement according to further implementations. In FIG. 2, a processor 202 is connected to a bus 204. Various target devices 206 (e.g. memory device(s) 206 and/or other device(s)) are also connected to the bus 204. In examples where the target devices 206 are memory devices, the bus 204 is a memory bus. Similar to the bus 106 of FIG. 1, the bus 204 can include a control portion 220, an address portion 222, and a privilege information portion 224.

The processor 202 includes a memory controller 210 that is able to issue a memory request over the bus 204. Although the memory controller 210 is shown as being part of the processor 202 in FIG. 2, it is noted that the memory controller 210 can be external of the processor 202 in other examples.

The memory controller 210 is able to manage the access (read and/or write) of memory region(s) in the target devices 206. In response to a request issued by a program module executing on the processor 202, the memory controller 210 is able to issue a corresponding memory request over the bus 204.

The processor 202 also includes a program counter register 212 (which can also be referred to as an instruction counter or an instruction address register), which contains an identifier of a current instruction (or instructions) of the program module that is (are) currently executing in the processor 202. The program counter register 212 is associated with a privilege level register 214, which stores a privilege level indicator representing the privilege level of the current instruction (or instructions) that the processor 202 is executing.

Based on the instruction(s) identified by the program counter register 212, the memory controller 210 is able to issue a memory request over the bus 204. The memory request includes information in the control portion 220 and the address portion 222 of the bus 204. In addition, the value in the privilege information portion 224 of the bus 204 for the memory request is set by the memory controller 210 based on the information in the privilege level register 214 for the currently executing instruction(s) identified in the program counter register 212.

Responsive to a different program module being loaded for execution on the processor 202, the content of the program counter register 212 and the corresponding privilege level register 214 can be updated. Responsive to a change in the privilege level indicated by the privilege level register 214, any memory request sent by the memory controller 210 over the bus 214 would include a different value in the privilege information portion 224 of the bus 214.

In other implementations, the requester 102 can be a virtual machine (VM). A VM emulates a physical machine, and can include an operating system and one or multiple application programs. Multiple VMs in a system can share the physical resources of the system, which can be allocated to the VMs using a VMM or hypervisor in the system.

In some cases, a VM is capable of directly accessing a physical resource of a system. In such cases, a privilege level of a program module running in a VM can be indicated by setting a respective value on the privilege information portion of a bus, as discussed above.

Figure 3:
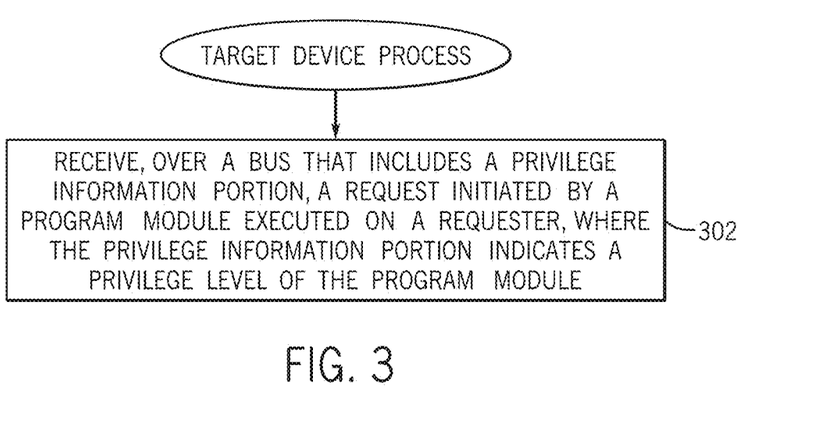
FIGS. 3 and 4 are flow diagrams of example processes of a target device, according to some implementations.

FIG. 3 is a flow diagram of an example process according to some implementations. The process of FIG. 3 can be performed by a target device, such as the target device 104 of FIG. 1 or one of the target devices 206 of FIG. 2.

The target device receives (at 302), over a bus (e.g. bus 106 or 204) a request initiated by a program module executed on a requester (e.g. 102 or 202). The bus over which the request is received includes a privilege information portion that carries information indicating a privilege level, from among multiple privilege levels, at which the program module is executed.

Figure 4:
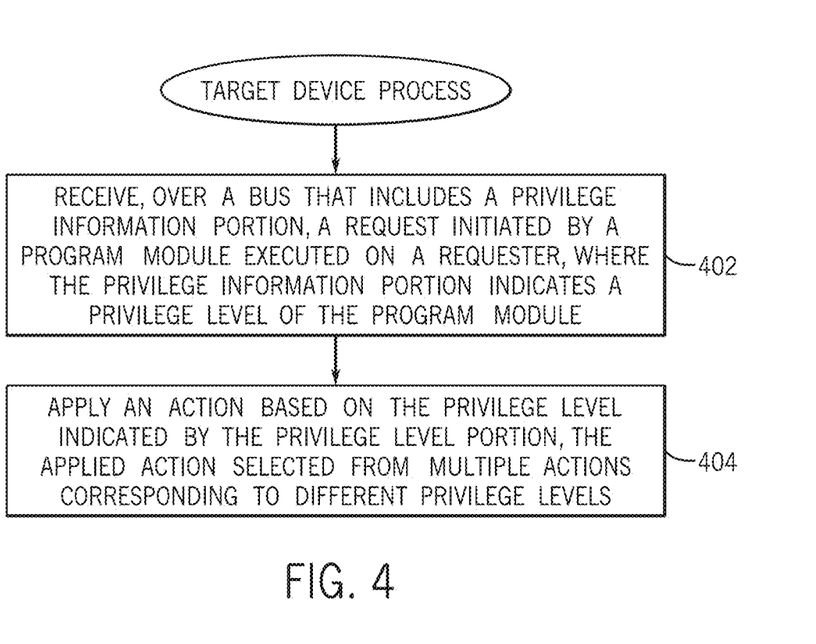

FIG. 4 is a flow diagram of another example process performed by a target device according to further implementations. The target device receives (at 402), over a bus, a request initiated by a program module executed on a requester, where the bus includes the privilege information portion discussed above for indicating a privilege level of the program module.

The target device applies (at 404) an action based on the privilege level indicated by the privilege information portion. The action that is applied is selected from multiple security actions that can be performed by the target device for respective different privilege levels that can be indicated by information in the privilege information portion of the bus. For example, the applied action can disallow access to a requested resource. As another example, the applied action can grant just read-only access to the requested resource.

Figure 5:
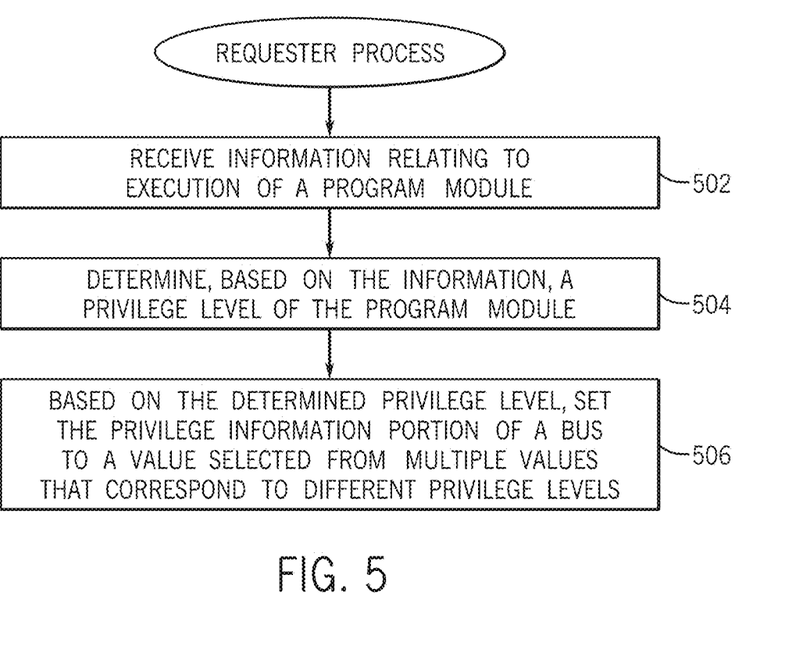
FIG. 5 is a flow diagram of an example process of a requester, according to some implementations.

FIG. 5 is a flow diagram of a process that can be performed by a requester (e.g. 102 in FIG. 1 or 202 in FIG. 2), according to some implementations. In more specific examples, the process of FIG. 5 can be performed by the memory controller 210 of FIG. 2, or by another controller.

The process of FIG. 5 receives (at 502) information relating to execution of a program module on a requester. The received information can include the content of the program counter register 212 and the privilege level register 214 of FIG. 2, for example. The process of FIG. 5 then determines (at 504), based on the information, a privilege level of the program module. Based on the determined privilege level, the process of FIG. 5 sets (at 506) the privilege information portion of a bus to a value selected from multiple values that correspond to respective different privilege levels.

Figure 6:
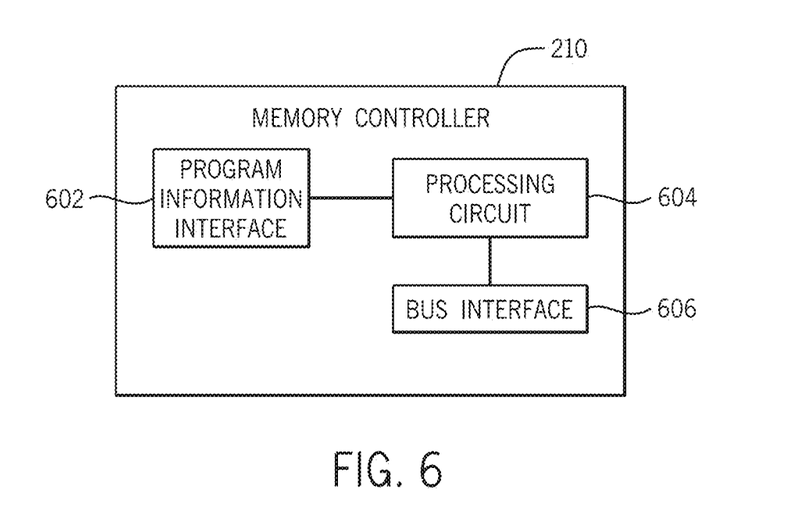
FIG. 6 is a block diagram of an example memory controller, according to some implementations.

FIG. 6 is a block diagram of an example of the memory controller 210, according to some implementations. More generally, FIG. 6 can depict another type of controller. The memory controller 210 includes a program information interface 602 to receive information (such as from the program counter register 212 and privilege level register 214 of FIG. 2) relating to execution of a program module. The program information interface 602 can include buffers and other logic to receive and store information.

The memory controller 210 also includes a processing circuit 604, which can be implemented using hardware or a combination of machine-readable instructions and hardware. The processing circuit 604 can perform various tasks of the memory controller 210, including tasks shown in FIG. 5, for example.

In addition, the memory controller 210 includes a bus interface 606 to communicate over a bus, such as the bus 106 in FIG. 1 or 204 in FIG. 2.

Figure 7:
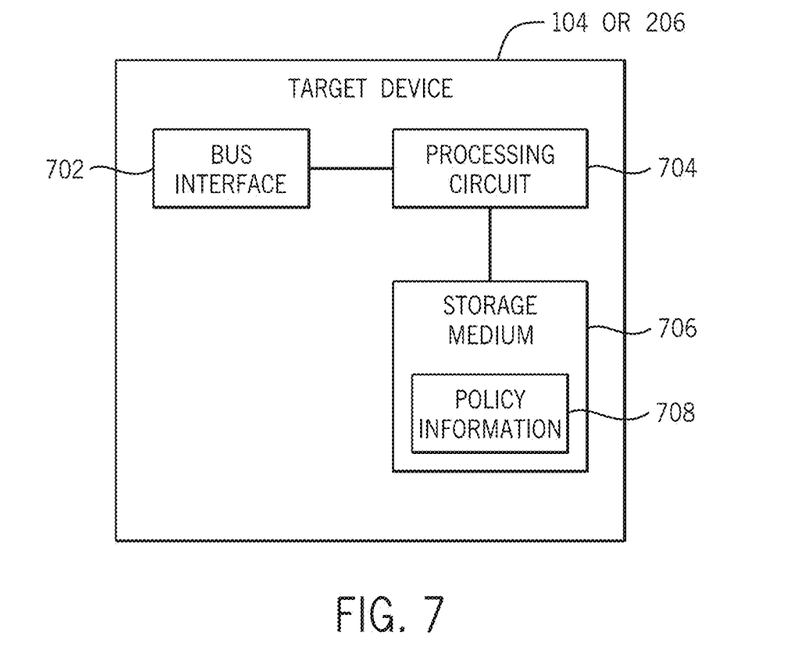
FIG. 7 is a block diagram of an example target device, according to some implementations.

FIG. 7 is a block diagram of an example target device 104 or 206, in accordance with some implementations. The target device includes a bus interface 702 to communicate over a bus. The target device also includes a processing circuit 704 (hardware or a combination of hardware and machine-readable instructions) to perform tasks of the target device, including tasks depicted in FIG. 3 or 4.

In addition, the target device includes a storage medium 706 that stores policy information 708, such as the policy information discussed above.

By using techniques or mechanisms according to some implementations, a target device receiving a request from a requester is able to determine, using information carried in a privilege information portion of a bus, a privilege level of a program module that initiated the request. Without use of the privilege information portion of a bus as described in this disclosure, the privilege level of a program module that imitated a request would not be visible to the target device.

In some examples as noted above, machine-readable instructions can be executed by the processing circuit 604 or 704 of FIG. 6 or 7, respectively. Such machine-readable instructions can be stored in a non-transitory machine-readable storage medium, which can include any or some combination of different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An electronic device comprising:
 a requester comprising a hardware processor;
 a first program executable at the requester;
 a virtual machine comprising a second program executable at the requester;
 a target component; and
 a bus interconnecting the requester and the target component, wherein the bus comprises a first portion dedicated to carry information indicating a privilege level, from among a plurality of privilege levels, of a requester program that is one of the first program and second program, wherein the first program is associated with a first privilege level, and the second program is associated with a second privilege level different from the first privilege level, the requester program to initiate a request over the bus to the target component, and the requester to, in response to the request:
 determine, by accessing a mapping structure that maps different programs to respective different privilege levels of the plurality of privilege levels, the privilege level for the requester program, and
 responsive to the determining, set, in the first portion of the bus, the information indicating the privilege level,
 wherein the requester is to set the first portion of the bus to a first value indicating the first privilege level in response to the first program initiating the request over the bus, and
 wherein the requester is to set the first portion of the bus to a second value indicating the second privilege level in response to the second program in the virtual machine initiating the request over the bus.

2. The electronic device of claim 1, wherein the bus comprises a second portion to carry an address of the request.

3. The electronic device of claim 1, wherein the first portion of the bus comprises at least one lane settable to different values by the requester for indicating the respective different privilege levels of the plurality of privilege levels.

4. The electronic device of claim 1, wherein the first portion of the bus comprises a plurality of lanes settable to different values by the requester for indicating the respective different privilege levels of the plurality of privilege levels.

5. The electronic device of claim 1, further comprising a memory controller to set the information carried in the first portion of the bus.

6. The electronic device of claim 1, wherein the bus comprises a memory bus or an input/output (I/O) bus.

7. The electronic device of claim 1, wherein the target component is to apply an action based on the privilege level indicated by the information in the first portion, wherein the target component is to perform different actions responsive to the respective different privilege levels of the plurality of privilege levels.

8. A method comprising:

receiving, by a requester comprising a hardware processor, a request from requester program to access a target component, wherein a first program and a virtual machine comprising a second program are executable at the requester;

in response to the request, determining, by the requester by accessing a mapping structure that maps different programs to respective different privilege levels, a privilege level for the requester program, wherein the first program is associated with a first privilege level, and the second program in the virtual machine is associated with a second privilege level different from the first privilege level;

responsive to the determining, setting, in a first portion of a bus that interconnects the requester and the target component, information indicating the privilege level, the first portion of the bus dedicated to carry the information indicating the privilege level, wherein the requester sets the first portion of the bus to a first value indicating the first privilege level in response to the first program initiating the request over the bus, and wherein the requester sets the first portion of the bus to a second value indicating the second privilege level in response to the second program in the virtual machine initiating the request over the bus; and sending the request and the information indicating the privilege level over the bus to the target component, the information indicating the privilege level included in the first portion of the bus.

9. The method of claim 8, further comprising:

accessing, by the target component, policy information in response to the information indicating the privilege level to determine an action to apply; and applying, by the target component, the action, wherein different actions are performed by the target component responsive to the respective different privilege levels.

10. The method of claim 8, wherein the bus comprises a plurality of lanes, wherein the first portion comprises a first subset of the lanes dedicated to carrying the information indicating the privilege level, and wherein a second subset of the lanes carries an address.

11. A controller comprising:

an interface to receive information relating to execution of a requester program that issued a request, the requester program being one of a first program and a second program, the second program included in a virtual machine;

a bus interface to a bus; and a processing circuit to:

determine, based on the information and by accessing a mapping structure that maps different programs to respective different privilege levels of a plurality of privilege levels, a privilege level of the requester program, wherein the first program is associated with a first privilege level, and the second program in the virtual machine is associated with a second privilege level different from the first privilege level; and based on the determined privilege level, set a privilege information portion of a bus to a value selected from a plurality of values, the plurality of values corresponding to respective privilege levels of the different privilege levels, the value indicating the determined privilege level, and the privilege information portion of the bus comprising a dedicated subset of lanes of the bus, wherein the processing circuit is to set the privilege information portion of the bus to a first value indicating the first privilege level in response to the first program issuing the request, and wherein the processing circuit is to set the privilege information portion of the bus to a second value indicating the second privilege level in response to the second program in the virtual machine issuing the request.

12. The controller of claim 11, wherein a second subset of the lanes comprises an address, and a third subset of the lanes comprises control information identifying a type of operation on the bus.

13. The electronic device of claim 5, wherein the memory controller is part of the requester.

14. The electronic device of claim 1, wherein the first portion of the bus is reserved for carrying information indicating privilege levels of the plurality of privilege levels, and is not for carrying other information.

15. The method of claim 8, wherein the requester comprises a memory controller to set, in the first portion of the bus, the information indicating the privilege level.

* * * * *